United States Patent
Allen

(10) Patent No.: US 11,404,859 B2
(45) Date of Patent: Aug. 2, 2022

(54) METHOD AND APPARATUS FOR INTRODUCING A CABLE INTO A CONDUIT

(71) Applicant: WESCO Distribution, Inc., Pittsburgh, PA (US)

(72) Inventor: Jerry L. Allen, Sarasota, FL (US)

(73) Assignee: WESCO Distribution, Inc., Pittsburgh, PA (US)

( * ) Notice: Subject to any disclaimer, the term of this patent is extended or adjusted under 35 U.S.C. 154(b) by 214 days.

(21) Appl. No.: 16/841,719

(22) Filed: Apr. 7, 2020

(65) Prior Publication Data

US 2020/0335960 A1    Oct. 22, 2020

Related U.S. Application Data

(60) Provisional application No. 62/836,795, filed on Apr. 22, 2019.

(51) Int. Cl.
*H02G 9/06* (2006.01)
*H02G 1/08* (2006.01)
*H02G 3/04* (2006.01)

(52) U.S. Cl.
CPC .......... *H02G 9/06* (2013.01); *H02G 1/08* (2013.01); *H02G 3/0481* (2013.01)

(58) Field of Classification Search
CPC .......... H02G 9/06; H02G 1/08; H02G 3/0481
USPC ........................................ 174/135
See application file for complete search history.

(56) References Cited

U.S. PATENT DOCUMENTS

| | | | | |
|---|---|---|---|---|
| 3,624,267 A * | 11/1971 | Plummer | .......... | H01B 11/1016 174/68.3 |
| 5,178,923 A * | 1/1993 | Andrieu | .......... | D03D 1/0043 428/36.1 |
| 6,251,201 B1 * | 6/2001 | Allen | .......... | H02G 1/08 29/868 |
| 6,262,371 B1 * | 7/2001 | Allen | .......... | H02G 9/06 138/116 |
| 6,421,485 B2 * | 7/2002 | Morris | .......... | H02G 9/065 385/100 |
| 7,799,997 B2 * | 9/2010 | Bedingfield | .......... | G02B 6/4459 174/93 |
| 8,502,069 B2 * | 8/2013 | Holland | .......... | H02G 3/0481 57/212 |
| 9,054,507 B2 * | 6/2015 | Allen | .......... | H02G 3/0481 |

(Continued)

FOREIGN PATENT DOCUMENTS

DE    10204019 A1    8/2003

OTHER PUBLICATIONS

International Search Report for PCT/US2020/028067 dated Jun. 5, 2020.

*Primary Examiner* — Timothy J Thompson
*Assistant Examiner* — Michael F McAllister
(74) *Attorney, Agent, or Firm* — Renner, Kenner, Greive, Bobak, Taylor & Weber

(57) ABSTRACT

An apparatus (10 which is to be inserted into a longitudinally extending conduit includes at least one longitudinally extending compartment (11) formed by attached the ends of a sheet of material (12) together. Another sheet of material (15) has one end attached to the compartment (11) and has compatible fastening elements (16, 17) on its opposed ends. A cable (19) may be positioned adjacent to the sheet of material (15) and it is folded around the cable (19) to form an additional compartment (18). The apparatus (10) may then be inserted into a conduit.

20 Claims, 2 Drawing Sheets

(56) References Cited

U.S. PATENT DOCUMENTS

| | | | | |
|---|---|---|---|---|
| 9,362,725 B2* | 6/2016 | Morris | | H05K 9/0098 |
| 10,177,546 B2* | 1/2019 | Allen | | H01B 17/00 |
| 10,870,931 B2* | 12/2020 | Morris | | D03D 13/004 |
| 11,146,050 B2* | 10/2021 | Dunahoo | | H02G 3/0406 |
| 2002/0098311 A1* | 7/2002 | Lindner | | D04H 1/555 |
| | | | | 428/920 |
| 2003/0185527 A1* | 10/2003 | Morris | | F16L 9/19 |
| | | | | 385/100 |
| 2008/0054236 A1* | 3/2008 | Morris | | H02G 9/06 |
| | | | | 254/134.4 |
| 2008/0264669 A1* | 10/2008 | Bedingfield | | G02B 6/4459 |
| | | | | 174/99 R |
| 2009/0314517 A1 | 12/2009 | Allen | | |
| 2012/0073854 A1* | 3/2012 | Allen | | H02G 3/0487 |
| | | | | 174/68.1 |
| 2012/0073860 A1* | 3/2012 | Allen | | H02G 3/0487 |
| | | | | 174/135 |
| 2013/0105215 A1* | 5/2013 | Morris | | H05K 9/0098 |
| | | | | 174/394 |
| 2015/0244155 A1* | 8/2015 | Allen | | H02G 9/065 |
| | | | | 254/134.3 R |
| 2020/0199793 A1* | 6/2020 | Bedingfield | | D03D 15/46 |
| 2020/0203937 A1* | 6/2020 | Bedingfield | | H02G 3/0487 |

* cited by examiner

METHOD AND APPARATUS FOR INTRODUCING A CABLE INTO A CONDUIT

CROSS-REFERENCE TO RELATED APPLICATION

This application claims the benefit of U.S. Provisional Patent Application Ser. No. 62/836,795 filed on Apr. 22, 2019 the totality of which is incorporated herein by reference.

TECHNICAL FIELD

This invention relates to a method and apparatus for introducing a communications cable into a conduit usually positioned underground. More particularly, this invention relates to such a method and apparatus which introduces an innerduct at the same time as the cable.

BACKGROUND ART

Positioning cables in underground communication conduits which extend for several thousand feet has long been a problem. Such is particularly true when it is desired to position an additional cable or cables into a conduit that already has a cable in it. That existing cable, particularly because of its plastic jacket, provides a great deal of friction to the new cable as it is being inserted into the conduit. As a result, the new or the existing cable may be damaged during the installation process. Such is particularly true when the cable in the conduit is undulating which causes the cable being introduced to take a sinuous, fraction-laden path.

An extremely successful solution to this problem is a fabric innerduct sold under the trademark MAXCELL® by WESCO Distribution, Inc. and shown in U.S. Pat. No. 6,262,371 which is incorporated herein by reference for whatever details may be necessary to understand the present invention. This fabric innerduct is first positioned in a conduit and divides the conduit into longitudinally extending compartments. A cable can then be positioned in one of the compartments, and a pull tape or rope can be positioned in one or more compartments which can later be utilized to pull additional cables into the compartments. Because there is a fabric between the cables, the friction is not on the cable jacket but on the fabric which makes installation easier.

However, use of this innerduct to install a cable in a conduit is currently a two-step process. That is, first the innerduct is inserted into a conduit and then, at a later time, a cable is inserted into one of the compartments of the innerduct. Such is inefficient because of the time and money expended for each step.

Thus, the need exists for a system which avoids this two-step process.

DISCLOSURE OF THE INVENTION

It is thus an object of one aspect of the present invention to provide a method and apparatus by which an innerduct and at least one cable in a compartment of the innerduct are simultaneously introduced into a conduit.

It is an object of another aspect of the present invention to provide a method and apparatus, as above, wherein the innerduct includes other compartments for the later introduction of one or more additional cables.

It is an object of an additional aspect of the present invention to provide a method and apparatus, as above, in which cable pulling devices, positioned in other compartments of the innerduct, can be simultaneously introduced in the conduit.

These and other objects of the present invention, as well as the advantages thereof over existing prior art forms, which will become apparent from the description to follow, are accomplished by the improvements hereinafter described and claimed.

In general, an apparatus to be inserted into a longitudinally extending conduit according to the present invention includes at least one longitudinally extending compartment. A longitudinally extending sheet of material is attached to the compartment. That sheet has compatible fastener elements carried on opposed ends thereof. A longitudinally extending cable is positioned between the ends of the sheet, and the ends are attached to each other to form an additional compartment carrying the cable.

In accordance with another aspect of the present invention an apparatus to be inserted into a longitudinally extending conduit includes at least one longitudinally extending compartment. A sheet of material has compatible fastening elements carried as opposed ends. One of the ends of the sheet is attached to the compartment. A longitudinally extending cable is positioned so that when the ends of the sheet of material are attached to form an additional compartment, the cable is in the additional compartment.

A method for introducing a cable into a longitudinally extending conduit according to the present invention which includes the steps of forming at least one longitudinally extending compartment, connecting a longitudinally extending sheet of material to the compartment, forming an additional compartment with the cable in it by attaching the ends of the sheet together around the cable, and inserting the compartments into the conduit.

In accordance with another aspect of the present invention a method for introducing a cable into a longitudinally extending conduit includes the steps of forming at least one longitudinally extending compartment, connecting a longitudinally extending sheet of material to the compartment, positioning a cable adjacent to the sheet of material, attaching the ends of the sheet of material to form an additional compartment with the cable in it, and inserting the compartments into the conduit.

A preferred exemplary apparatus according to the concepts of the present invention which can be used to perform the method of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
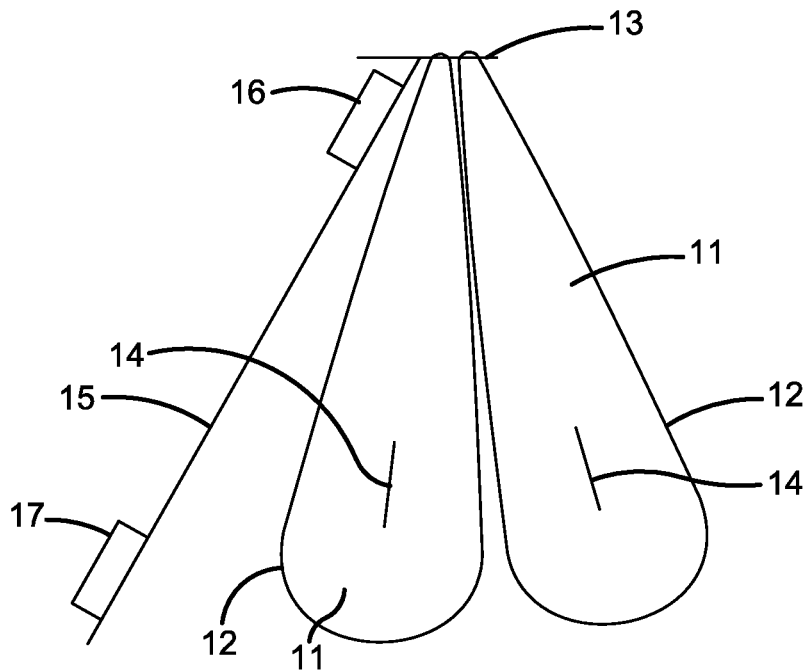
FIG. 1 is a schematic end view of the apparatus of the present invention during one step of the manufacturing process before the additional compartment is formed.
Figure 2:
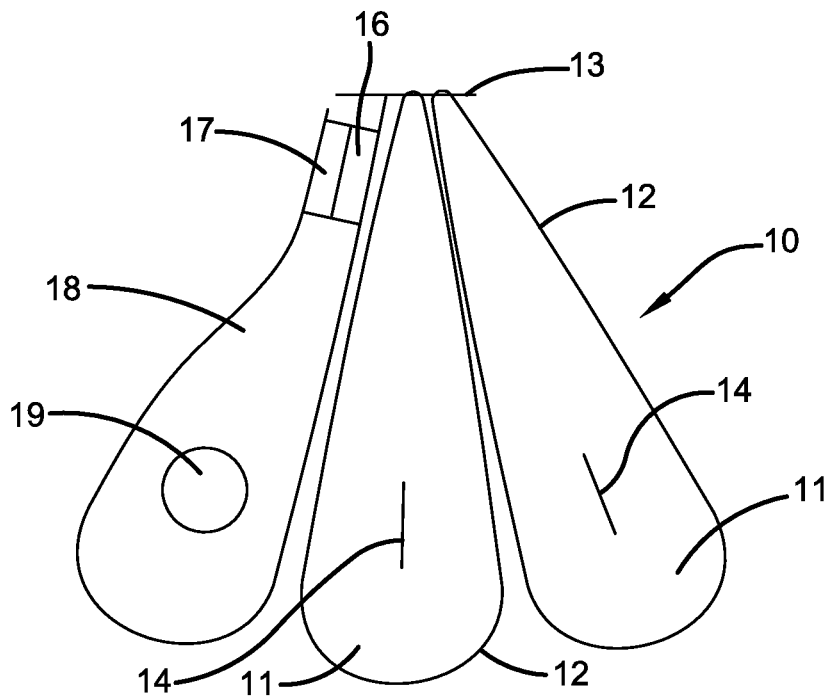
FIG. 2 is a schematic representation of the apparatus at the end of the manufacturing process showing the cable in the additional compartment.

An apparatus to be introduced into a conduit is indicted generally by the numeral 10 and shown in its completed condition in FIG. 2. Part of its construction can be a conventional innerduct as shown in U.S. Pat. No. 6,262,371. Thus, this innerduct includes a plurality of longitudinally extending fabric compartments 11 formed by sheets of material 12 having their open ends stitched together, as at stitching 13, to form the compartments 11. The material 12 is of a lower coefficient of friction than any cable to be positioned in it. Pull tapes 14 or the like can be positioned in compartments 11. As is known in the art, when the innerduct is in a conduit, a cable can be attached to a pull tape, and the cable can be pulled into the conduit.

A sheet of material 15, which can be also made of a fabric which exhibits low friction, is attached at one end to compartments 11. The same stitching 13 can be utilized to make the connection. Compatible fasteners 16, 17 are positioned at opposed ends of sheet 15. These fasteners 16, 17 can be the compatible hook and loop portions of a VEL-CRO® fastening system, could be the compatible portions of a zipper, or the like.

Figure 3:
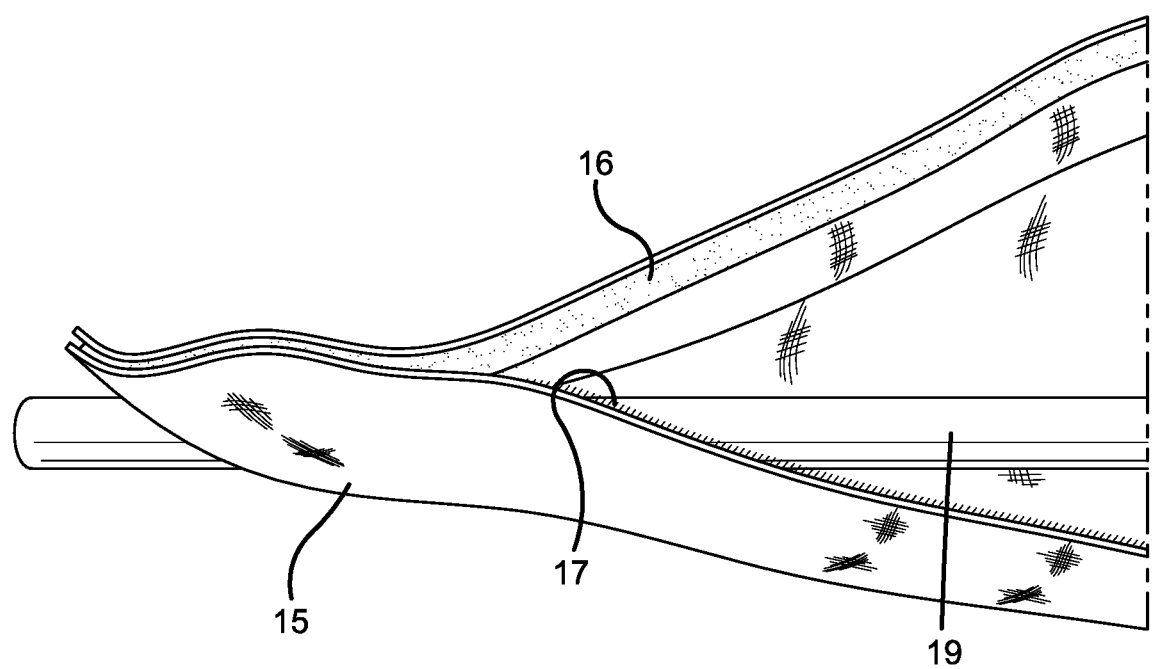
FIG. 3 is a depiction showing the manner in which the sheet is used to form the additional compartment confining a cable.

As shown if FIG. 3, in order to form the additional compartment 18 with a cable 19 in it, a device (not shown) folds the sheet 15, moves it over cable 19, and attaches the fastening elements 16 and 17 together. Such could be done manually as well.

The assembled apparatus 10 may then be inserted into an underground conduit. In so doing, two steps in the prior art installation process are combined into one. That is, a cable 19 and an innerduct are inserted at the same time whereas in the prior art, an innerduct was first installed and then later a cable was put into a compartment in the innerduct. In addition, at the same time that cable 19 is installed into a conduit, pull tapes 14 may also be installed in compartments of the innerduct.

It should thus be evident that a device constructed as described herein, which performs the method of the present invention, accomplishes the objects of the present invention and otherwise substantially improves the art.

What is claimed is:

1. A method of introducing a cable into a longitudinally extending conduit comprising the steps of forming at least one longitudinally extending compartment, connecting one end of a longitudinally extending sheet of material to the compartment, positioning a cable adjacent to the sheet of material, attaching the ends of the sheet of material to form an additional compartment with the cable in the additional compartment, and inserting the compartments into the conduit.

2. The method of claim 1 further comprising the step of inserting a pulling device in the at least one longitudinally extending compartment.

3. The method of claim 1 wherein the step of forming includes the step of first attaching the ends of a second sheet of material.

4. The method of claim 3 wherein the step of connecting a positions one side of the sheet of material adjacent to the compartment, and the step of attaching is accomplished by connecting the ends of the other side of the sheet of material.

5. The method of claim 1 wherein the step of attaching includes the step of attaching one end of the sheet at the position where the ends of the second sheet of material of the at least one compartment are haven been previously attached.

6. A method of introducing a cable into a longitudinally extending conduit comprising the steps of first forming at least one longitudinally extending compartment, then connecting a longitudinally extending sheet of material outside of the compartment, forming an additional compartment with a cable in it by attaching the ends of the sheet of material around the cable, and inserting the compartments into the conduit.

7. The method of claim 6 further comprising the step of inserting a pulling device in the at least one longitudinally extending compartment.

8. The method of claim 1 wherein the step of forming the at least one longitudinally extending compartment includes the step of attaching the ends of a second sheet of material.

9. The method of claim 8 wherein the step of connecting a longitudinally extending sheet of material to the compartment is accomplished by attaching one end of the sheet of material to the compartment.

10. The method of claim 9 wherein the step of attaching one end includes the step of attaching one end of the sheet at the position where the ends of the second sheet of material of the at least one compartment are attached.

11. An apparatus to be inserted into a longitudinally extending conduit comprising at least one longitudinally extending compartment, a longitudinally extending sheet of material having one end attached to the outside of said compartment, said sheet of material having compatible fastening elements carried on opposed ends of said sheet of material such that a longitudinally extending cable can be positioned between said ends and said ends can be attached to each other to form an additional compartment carrying the cable.

12. The apparatus of claim 11 further comprising a pulling device in said at least one longitudinally extending compartment.

13. The apparatus of claim 11 wherein said at least one compartment and said additional compartment are made of a material having a lower coefficient of friction than said cable.

14. The apparatus of claim 13 wherein said material is a fabric.

15. The apparatus of claim 11 wherein the ends of a sheet of material are connected at a point to form said at least one longitudinally extending compartment, and one end of said sheet of material is attached to said at least one longitudinally extending compartment at said point.

16. The apparatus of claim 11 wherein said compatible fastening elements are a hook material and a loop material.

17. An apparatus to be inserted into a longitudinally extending conduit comprising at least one longitudinally extending compartment, a sheet of material having one end attached to said compartment and having a side facing said compartment, the other side of said sheet of material having compatible fastening elements carried on opposed ends, a longitudinally extending cable positioned adjacent to the other side of said sheet of material so that when said ends of said sheet of material are attached to form an additional compartment, said cable is in said additional compartment.

18. The apparatus of claim 17 further comprising a pulling device in said at least one longitudinally extending compartment.

19. The apparatus of claim 17 wherein said at least one compartment and said additional compartment are made of a material having a lower coefficient of friction than said cable.

20. The apparatus of claim 19 wherein said material is a fabric.

* * * * *